(12) United States Patent
Kim et al.

(10) Patent No.: US 6,836,412 B2
(45) Date of Patent: Dec. 28, 2004

(54) SIDE-ACCESSIBLE COMPUTER SYSTEM ENCLOSURE AND METHOD

(75) Inventors: David J. Kim, San Jose, CA (US); Dimitry Struve, Los Altos, CA (US); William W. Ruckman, San Jose, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 33 days.

(21) Appl. No.: 09/951,990

(22) Filed: Sep. 13, 2001

(65) Prior Publication Data

US 2003/0048622 A1 Mar. 13, 2003

(51) Int. Cl.[7] .................................................. H05K 7/14
(52) U.S. Cl. ...................................... 361/796; 361/752
(58) Field of Search ................................ 361/777, 783, 361/784, 803, 785, 790, 752, 753, 756, 759, 796, 800, 801, 802; 257/723; 174/261; 365/51, 52, 63; 220/4.02

(56) References Cited

U.S. PATENT DOCUMENTS

| | | | | |
|---|---|---|---|---|
| 4,578,739 A | * | 3/1986 | McKee et al. ............... 361/740 |
| 4,931,909 A | * | 6/1990 | Backes ........................ 361/686 |
| 5,031,070 A | * | 7/1991 | Hsu ............................. 361/683 |
| 5,121,296 A | | 6/1992 | Hsu |
| 5,419,626 A | | 5/1995 | Crockett |
| 5,566,050 A | * | 10/1996 | Seto et al. .................. 361/686 |
| 5,626,406 A | * | 5/1997 | Schmid ....................... 211/26 |
| 6,058,011 A | * | 5/2000 | Hardt et al. ........... 165/104.33 |
| 6,097,591 A | * | 8/2000 | Ircha ........................ 312/223.2 |
| 6,373,692 B1 | * | 4/2002 | Cheng ........................ 220/4.02 |
| 6,404,651 B1 | * | 6/2002 | Martin et al. ............... 361/801 |
| 6,538,900 B2 | * | 3/2003 | Zhou et al. ................. 361/796 |

* cited by examiner

Primary Examiner—David Martin
Assistant Examiner—Thanh S. Phan
(74) Attorney, Agent, or Firm—Meyertons Hood Kivlin Kowert & Goetzel, P.C.; B. Noël Kivlin

(57) ABSTRACT

An enclosure includes a base having an interior volume and a first cover attachable to the base and adapted to cover a first portion of the interior volume of the base such that, with the first cover attached to the base, a second portion of the interior volume of the base is accessible. The enclosure further includes a second cover attachable to the base and adapted to cover a second portion of the interior volume of the base, wherein the first cover in combination with the second cover covers generally all of the interior volume of the base.

27 Claims, 2 Drawing Sheets

SIDE-ACCESSIBLE COMPUTER SYSTEM ENCLOSURE AND METHOD

BACKGROUND OF THE INVENTION

1. Field of the Invention

This invention relates to a method and apparatus for accessing components from within a computer system enclosure.

2. Description of the Related Art

Computer systems are general-purpose devices that may be modified to perform particular tasks or functions. Generally, computer systems include a motherboard, a power source, and other components mounted within an enclosure. The motherboard typically includes a number of connectors or slots in which special purpose printed circuit boards or "expansion cards", e.g., peripheral component interface (PCI) bus cards, industry standard architecture (ISA) bus cards, proprietary bus cards, and the like, may be inserted. These special-purpose cards may be used to add to or enhance the functionality of the computer system. For example, a conventional computer system may have its graphics capability enhanced by the addition of a graphics card. Similarly, the sound-producing capability of the computer system may be enhanced by the addition of a sound card.

In certain situations, it may be desirable to remove one or more expansion cards from the computer system. Conventionally, such cards are removed from a computer system by removing a top or side cover of the computer system enclosure. Removal of such a cover generally provides access to all of an interior volume of the enclosure. However, it may be necessary for the computer system to be removed from a rack holding the computer system before the top cover may be removed. Further, the use of a tool (e.g., a screwdriver, a nut driver, or the like) may be necessary to loosen and/or remove screws or the like so that the top cover may be removed.

SUMMARY OF THE INVENTION

In one aspect of the present invention, an enclosure is provided including a base having an interior volume and a first cover attachable to the base and adapted to cover a first portion of the interior volume of the base such that, with the first cover attached to the base, a second portion of the interior volume of the base is accessible. In a further aspect of the present invention, the enclosure further includes a second cover attachable to the base and adapted to cover a second portion of the interior volume of the base, wherein the first cover in combination with the second cover covers generally all of the interior volume of the base.

In another aspect of the present invention, a computer system is presented. The computer system includes a motherboard, a riser card electrically interconnected with the motherboard, and an expansion card electrically interconnected with the riser card. The computer system further has an enclosure including a base having an interior volume, and a first cover attachable to the base and adapted to cover a first portion of the interior volume of the base such that, with the first cover attached to the base, a second portion of the interior volume of the base is accessible, wherein the motherboard, the riser card, and the expansion card are disposed within the interior volume of the base. In a further aspect of the present invention, the computer system includes a second cover attachable to the base and adapted to cover the second portion of the interior volume of the base, wherein the first cover in combination with the second cover covers generally all of the interior volume of the base.

In yet another aspect of the present invention, a method is presented including disengaging a fastening member that secures a second cover to a first cover and a base, disengaging the second cover from the first cover and the base, and removing the second cover from the first cover and the base. The method further includes disengaging a first expansion card from a connector of a riser card and removing the first expansion card from an interior volume of the base.

BRIEF DESCRIPTION OF THE DRAWINGS

The invention may be understood by reference to the following description taken in conjunction with the accompanying drawings, in which the leftmost significant digit(s) in the reference numerals denote(s) the first figure in which the respective reference numerals appear, and in which.

Figure 1:
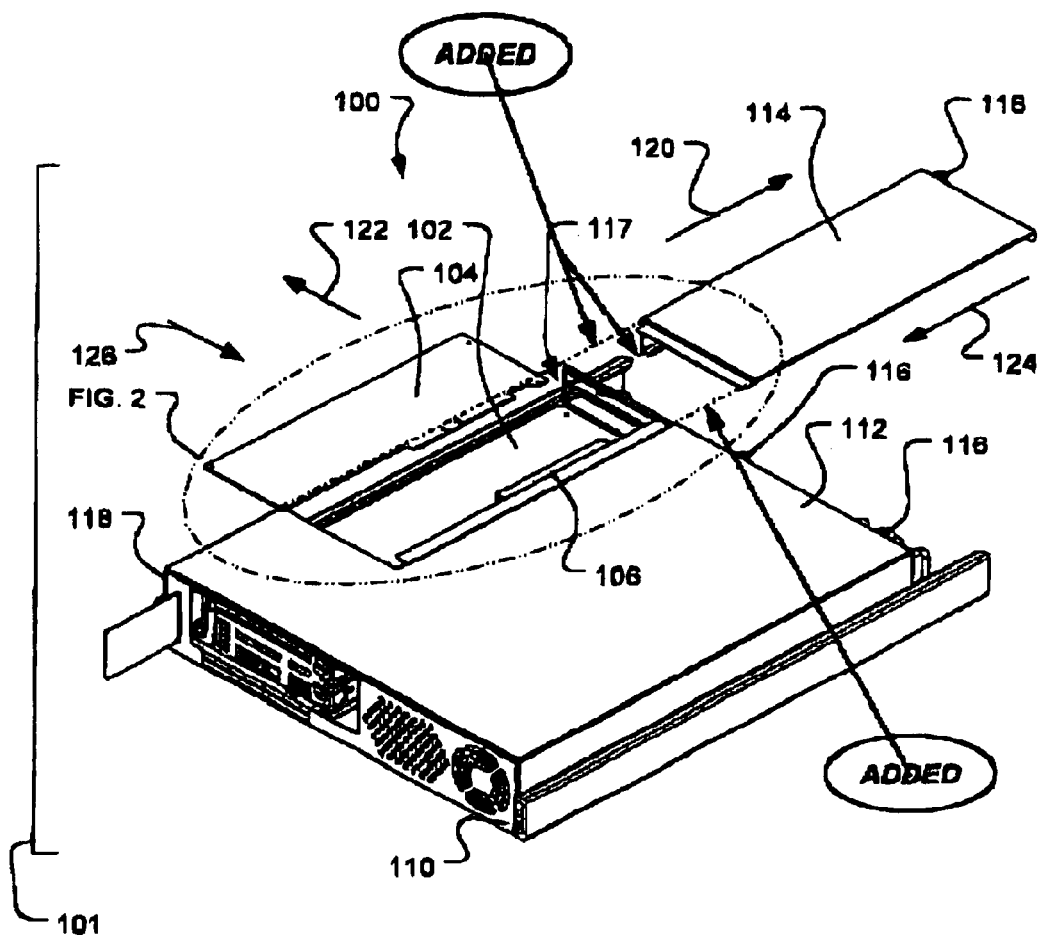
FIG. 1 is a partially-exploded perspective view of a computer system having a side-access enclosure according to the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

A computer system 100 according to the present invention is illustrated in FIG. 1. The computer system 100 includes an enclosure 101 that may house various components, e.g., a motherboard 102, a riser card 106, an expansion card 104, and the like. One or more expansion cards (e.g., the expansion card 104) may be interconnected with the riser card 106 via conventional edge connectors, thus allowing expansion cards to be used in enclosures that do not have sufficient height to accommodate such expansion cards or to increase the quantity of expansion cards that can be interconnected with the motherboard 102. In one embodiment, the expansion card 104 is a full-size PCI expansion card having dimensions of about 31 cm by about 11 cm.

As illustrated in FIG. 1, the enclosure 101 includes a base 110, a first cover 112, and a second cover 114. The first cover 112 in combination with the second cover 114, when installed onto the base 110, generally covers an interior volume of the base 110 and, thus, the components housed within the base 110. The first cover 112, when installed without the second cover 114, covers only a first portion of the interior volume of the base 110, leaving a second portion of the interior volume of the base 110 uncovered and thus accessible from outside the enclosure 101. In the illustrated embodiment, the first cover 112, when installed without the second cover 114, generally covers the components housed within the base 110 except for the riser card 106, one or more expansion cards (e.g., the expansion card 104 and the like), and a portion of the motherboard 102. The second cover 114 generally covers the components within the base 110 not covered by the first cover 112.

In the illustrated embodiment, the first cover 112 and the second cover 114 are secured to the base 110 by one or more fasteners, such as screws, twist connectors, and the like. In one embodiment, thumb screws 116 are employed to allow easy access to the interior of the enclosure 101 of the computer system 100 without using specialized tooling. In one embodiment, the base 110 has an opening 117 in a side wall 118 thereof to provide additional access to the expansion card 104 and other components housed proximate to the expansion card 104. The second cover 114 also covers the opening 117 in the side wall 118 when the second cover 114 is installed on the base 110.

Figure 2:
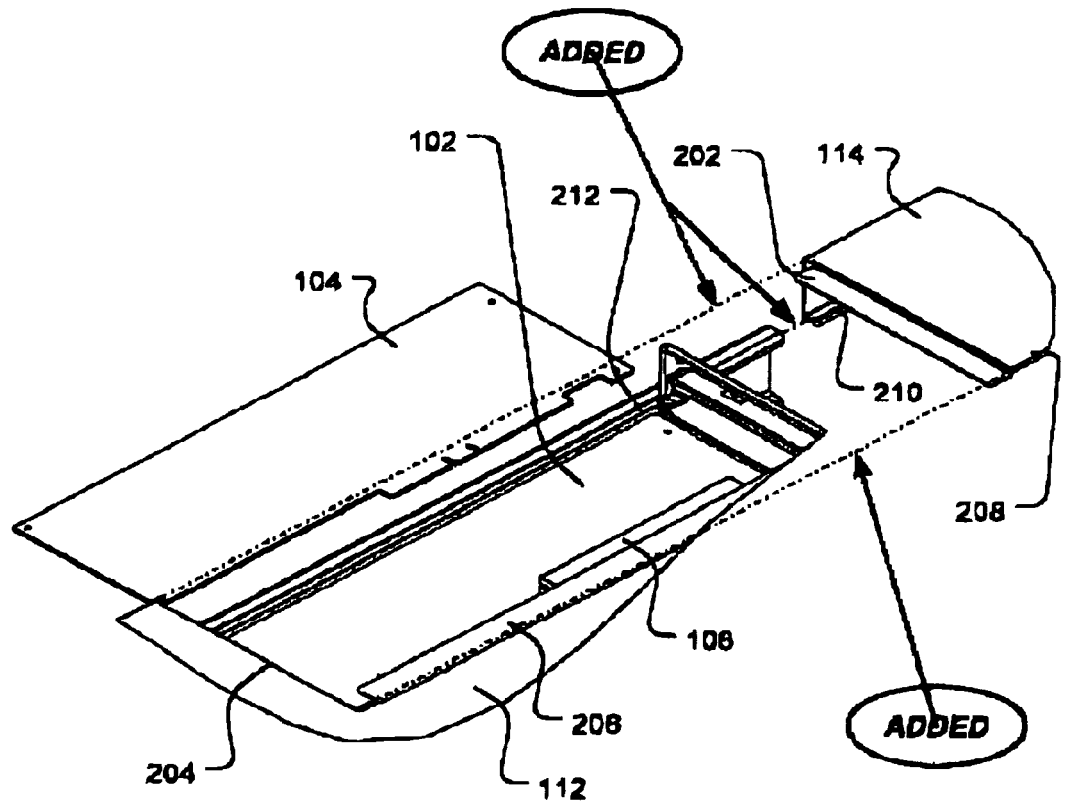
FIG. 2 is a partially-exploded partial perspective view of a portion of the computer system having the side-access enclosure illustrated in FIG. 1.

Referring now to FIG. 2, contact seams between various parts of the enclosure 101 help to inhibit electromagnetic interference, emanating from the electrical components of the computer system 100, from passing through the enclosure 101. Generally, the contact seams disrupt or otherwise inhibit current from being electromagnetically induced in and flowing through the various parts of the enclosure 101. In the illustrated embodiment, the second cover 114 includes a tab 202 that slides under an edge 204 of the first cover 112 during installation. The first cover 112 has a tab 206 that supports an edge 208 of the second cover 114 when the second cover 114 is installed onto the base 110. In the illustrated embodiment, the second cover 114 also has a generally U-shaped channel 210 that slides along a corresponding U-shaped channel 212 of the base 110 during installation. Thus, these contact seams are capable of inhibiting leakage of electromagnetic interference from the enclosure 101 emanating from components housed within the enclosure 101.

With the first cover 112 and the second cover 114 installed onto the base 110, removal of the expansion card 104 according to one embodiment of the present invention may proceed as follows with reference to FIGS. 1 and 2. The thumbscrew 116 securing the second cover 114 to the base 110 is disengaged from the base 110. The second cover 114 may then be moved relative to the base 110 and the first cover 112, as indicated by an arrow 120, and removed. The expansion card 104 may then be moved relative to the edge connector of the riser card 106, as indicated by an arrow 122, to disengage the expansion card 104 from the edge connector of the riser card 106. The second cover 114 may now be reinstalled onto the base 110 by sliding the second cover 114 relative to the first cover 112 and the base 110, as indicated by an arrow 124, so that the tab 206 of the first cover 112 is under the edge portion 208 of the second cover 114 and the tab 202 of the second cover 114 is under the edge portion 204 of the first cover 112. The second cover 114 may be secured to the base 110 by the thumbscrew 116.

According to one embodiment of the present invention, the expansion card 104 may be installed into the computer system 100 as follows with reference to FIGS. 1 and 2. With the first cover 112 and the second cover 114 installed onto the base 110, the thumbscrew 116 securing the second cover 114 to the base 110 may be disengaged from the base 110. The second cover 114 may then be moved relative to the base 110 and the first cover 112, as indicated by the arrow 120, and removed. The expansion card 104 may then be moved relative to the edge connector of the riser card 106, as indicated by an arrow 126, to mate the expansion card 104 with the edge connector of the riser card 106. The second cover 114 may now be reinstalled onto the base 110 by sliding the second cover 114 relative to the first cover 112 and the base 110, as indicated by the arrow 124, so that the tab 206 of the first cover 112 is under the edge portion 208 of the second cover 114 and the tab 202 of the second cover 114 is under the edge portion 204 of the first cover 112. The second cover 114 may be secured to the base 110 by the thumbscrew 116.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. An enclosure, comprising:
    a base having an interior volume;
    a first cover attachable to the base and configured to cover a first portion of the interior volume of the base such that, with the first cover attached to the base, a second portion of the interior volume of the base is accessible from a transverse and a longitudinal direction; and
    a second cover attachable to the base and configured to cover a second portion of the interior volume of the base, wherein:
    the first cover is engagable with the second cover, on a first side of the interior volume, forming a contact seam to inhibit electromagnetic interference from passing therethrough, wherein at least a portion of the contact seam includes a tab portion that is coplanar with the first side, an end portion of the first cover that engages the second cover, and an end portion of the second cover that engages the end portion of the first cover to inhibit electromagnetic interference from passing between the end portion of the first cover and the end portion of the second cover when the first cover is engaged with the second cover.

2. An enclosure, according to claim 1, further comprising a thumbscrew capable of attaching the first cover to the base.

3. An enclosure, according to claim 1, wherein the first cover in combination with the second cover substantially covers the interior volume of the base.

4. An enclosure, according to claim 1, further comprising a thumbscrew capable of attaching the second cover to the base.

5. An enclosure, according to claim 1, wherein the base further comprises a side wall defining an opening therethrough for accessing the second portion of the interior volume of the base and wherein the second cover, when attached to the base, covers the opening through the side wall of the base.

6. An enclosure, according to claim 1, wherein the base further comprises a first channel and the second cover further comprises a second channel slidably engagable with the first channel.

7. An enclosure, according to claim 6, wherein the first channel and the second channel, when engaged, form a contact seam to inhibit electromagnetic interference from passing therethrough.

8. An enclosure, according to claim 1, wherein at least a portion of the contact seam further comprises a tab of the second cover engagable with an edge portion of the first cover.

9. An enclosure, according to claim 8, wherein the tab of the second cover is engagable over substantially an entire length of the edge portion of the first cover.

10. An enclosure, according to claim 1, wherein at least a portion of the contact seam further comprises a tab of the first cover engagable with an edge portion of the second cover.

11. An enclosure, according to claim 10, wherein the tab of the first cover is engagable over substantially an entire length of the edge portion of the second cover.

12. An enclosure, according to claim 1, wherein:

the base further comprises a first channel;

the second cover further comprises a second channel slidably engagable with the first channel;

the second cover further comprises first tab engagable with an edge portion of the first cover; and the first cover further comprises a second tab engageable with an edge portion of the second cover, wherein, when the first cover and the second cover are attached to the base such that the first channel is engaged with the second channel, the first tab is engaged with the edge portion of the first cover, and the second tab is engaged with the edge portion of the second cover, the enclosure is capable of inhibiting electromagnetic signals from emanating from the enclosure.

13. The enclosure of claim 1, wherein the tab portion is part of the first cover and supports the edge of the second cover when the first cover is engaged with the second cover.

14. The enclosure of claim 1, wherein the tab portion is part of the second cover and supports the edge of the first cover when the first cover is engaged with the second cover.

15. The enclosure of claim 1, wherein the first cover includes a first tab and the second cover includes a second tab, wherein the first tab supports a portion of the second cover and the second tab supports a portion of the first cover when the first cover is engaged with the second cover.

16. The enclosure of claim 1, wherein the second cover covers substantially all of an expansion card such that when the second cover is removed, the expansion card is removeable in a transverse or longitudinal direction.

17. A method, comprising:

disengaging a fastening member that secures a second cover to a first cover and a base;

disengaging the second cover from the first cover and the base, wherein disengaging the second cover includes sliding the second cover in at least one direction to disengage a contact seam formed between the second cover and the first cover, wherein the contact seam includes a tab portion that is coplanar with a first side of an interior volume, defined at least partially by an end portion of the first cover and an end portion of the second cover, the end portion of the first cover that engages the second cover and the end portion of the second cover that engages the end portion of the first cover to inhibit electromagnetic interference from passing between the end portion of the first cover and the end portion of the second cover when the first cover is engaged with the second cover on the first side;

removing the second cover from the first cover and the base;

disengaging a first expansion card in a transverse direction from a connector of a riser card; and removing the first expansion card from an interior volume of the base, wherein said first expansion card is removable in both a longitudinal direction and a transverse direction.

18. A method, according to claim 17, further comprising:

placing a second expansion card within the interior volume of the base;

mating the second expansion card to the connector of the riser card;

engaging the second cover with the first cover and the base; and engaging the fastening member to secure the second cover to the first cover and the base.

19. A method, according to claim 17, further comprising:

engaging the second cover with the first cover and the base; and engaging the fastening member to secure the second cover to the first cover and the base.

20. A method, comprising:

disengaging a fastening member that secures a second cover to a first cover and a base;

disengaging at least one contact seam on a first side of an interior volume, defined at least partially by the first cover and the second cover, between the second cover, the first cover and the base, wherein the contact seam includes a tab portion that is coplanar with the first side, an end portion of the first cover that engages the second cover and an end portion of the second cover that engages the end portion of the first cover to inhibit electromagnetic interference from passing between the edge of the first cover and the edge of the second cover when the first cover is engaged with the second cover;

removing the second cover from the first cover and the base in a transverse direction; and removing a first expansion card from an interior volume of the base, wherein said first expansion card is removable in both a longitudinal direction and a transverse direction.

21. A method, according to claim 20, further comprising:

placing an expansion card within the interior volume of the base;

mating the expansion card to the connector of the riser card;

engaging the second cover with the first cover and the base; and engaging the fastening member to secure the second cover to the first cover and the base.

22. A method, according to claim 20, further comprising:

engaging the at least one contact seam between the second cover, the first cover and the base; and engaging the fastening member to secure the second cover to the first cover and the base.

23. An enclosure, comprising:

a first cover;

a second cover;

wherein a first surface of the enclosure is at least partially defined by an end portion of the first cover and an end portion of the second cover, wherein the end portion of the first cover engages the end portion of the second cover on the first surface; and a contact seam between the end portion of the first cover and the end portion of the second cover, wherein the contact seam comprises a first tab portion coplanar with the first surface, the end portion of the first cover, and the end portion of the second cover, wherein the first tab portion inhibits electromagnetic interference from passing between the end portion of the first cover and the end portion of the second cover.

24. The enclosure of claim 23, wherein the first surface is substantially flat and wherein the end portion of the first cover does not overlap the end portion of the second cover.

25. The enclosure of claim 23, wherein the end portion of the first cover and the end portion of the second cover form a continuous, substantially flat surface when the end portion of the first cover engages the end portion of the second cover.

26. The enclosure of claim 23, wherein a second tab portion, substantially perpendicular to the first tab portion, inhibits electromagnetic interference from passing between the end portion of the first cover and the end portion of the second cover at another location on the first surface where the first cover engages the second cover.

27. The enclosure of claim 23, wherein the end portion of the first cover and the end portion of the second cover are substantially straight.

* * * * *